United States Patent [19]
Anderson

[11] 3,745,882
[45] July 17, 1973

[54] DIGITAL CONTROL VALVE AND CONTROL SYSTEM
[75] Inventor: Robert L. Anderson, Tustin, Calif.
[73] Assignee: Bertea Corporation, Irvine, Calif.
[22] Filed: Dec. 27, 1971
[21] Appl. No.: 212,187

[52] U.S. Cl. .......................................... 91/1, 91/35
[51] Int. Cl. ..................... F01b 31/12, F15b 21/02
[58] Field of Search .................... 91/35, 1; 92/142

[56] References Cited
UNITED STATES PATENTS
2,531,340  11/1950  Mathip ............................. 91/35
3,530,743  9/1970   Jacobson .......................... 91/35

Primary Examiner—Martin P. Schwadron
Assistant Examiner—A. M. Zupcic
Attorney—Gordon L. Peterson et al.

[57] ABSTRACT

A control system comprising an actuator, a digital control valve for controlling the position of the fluid responsive member of the actuator, a device for producing a command signal for commanding a particular position of the fluid responsive member and electronic apparatus for processing the command signal to provide an input signal to which the digital control valve is responsive. The digital control valve includes two valves for moving the fluid responsive member of the actuator in opposite directions, respectively, and a digitizer for controlling the displacement of the fluid responsive member. In one form of the invention the control system includes a plurality of digital control valves with each of the digital control valves moving the fluid responsive member different amounts in response to appropriate input signals. By energizing more than one of the digital control valves, a step equal to the sum or difference of the energized digital control valves can be obtained.

15 Claims, 6 Drawing Figures

Fig. 3

INVENTOR
Robert L. Anderson
By: Smyth, Roston & Pavitt
ATTORNEYS

DIGITAL CONTROL VALVE AND CONTROL SYSTEM

BACKGROUND OF THE INVENTION

Fluid operated actuators such as hydraulic actuators are used for performing many different control functions. For example, hydraulic actuators are commonly used to control the position of aircraft control surfaces. Actuators are considered to be linear if the fluid responsive member thereof moves linearly and rotary if the fluid responsive member rotates. As used herein, the term "actuator" includes linear and rotary actuators.

In a typical system, the fluid responsive member of the actuator is appropriately positioned in response to certain commands which are usually electrical. The commands can be either digital or analogue. The command is appropriately processed to form an input signal, and a control valve is responsive to the input signal to control flow of fluid to and from the actuator to thereby control the position of the fluid responsive member.

SUMMARY OF THE INVENTION

The present invention provides certain improvements in control valves and in control systems of the type briefly described above. The control valve of this invention is a digital control valve which receives digital input signals and moves the fluid responsive member of the actuator one step in either direction in response to each of such input signals. The digital control valve includes first and second valves for moving the fluid responsive member in opposite directions, respectively, and a digitizer for accurately controlling the displacement of the fluid responsive member, i.e., the length of the step. Thus, the first and second valves control the direction of movement of the fluid responsive member, and the digitizer accurately controls the displacement of the fluid responsive member.

One feature of the invention is that if a predetermined failure occurs, both of the valves of the digital control valve are placed in a bypass mode, i.e., are opened to port fluid at supply pressure to both faces or sides of the fluid responsive member. This allows another actuator system to perform the control functions without hinderance from the disabled system. Preventing a disabled system from hindering the operation of a redundant actuator system is particularly important for aircraft control systems.

The predetermined failure may be hydraulic or electrical. The first and second valves include means responsive to a hydraulic failure to move the valve elements thereof to an open position. In the open position, each of the first and second valves provides communication between fluid at supply pressure and one face of the fluid responsive member of the actuator. Thus, in response to a hydraulic failure both faces of the fluid responsive member are subjected to fluid at the same pressure so that the net fluid force on the fluid responsive member is zero.

Each of the valves of the digital control valve is normally held in the closed position by a normally energized solenoid. In the closed position, the first and second valves block flow of fluid under pressure to the actuator. A loss of electrical power will cause de-energization of both solenoids and consequent opening of both of the first and second valves of the digital control valve. With both the first and second valves open, both faces of the fluid responsive member are provided with fluid at the same pressure.

During operation, a discrepancy may occur between the actuator position commanded by the command signal and the position to which the digital control valve moves the fluid responsive member. Another feature of this invention is to provide error correction by biasing the fluid responsive member of the actuator to a predetermined reset position and by causing the digital control valve to respond to a reset command by reducing the net hydraulic force on the fluid responsive member sufficiently to allow the biasing means to move the fluid responsive member to the predetermined position. This can be advantageously accomplished by de-energizing both of the solenoids to thereby move both of the valves of the digital control valve to the open position. In this event, both faces of the pressure responsive member are supplied with fluid at supply pressure with the result that the net fluid force acting on the fluid responsive member is zero. This allows the biasing means to move the fluid responsive member to the predetermined reset position. The predetermined reset position may be, for example, null or a hardover position.

One advantage of the present invention is that the digitizer is controlled by the first and second valves and not by a solenoid or other special elements. To illustrate, with the first valve in the open position, the following events occur:

1. Fluid at supply pressure is supplied through the open valve to one face of the fluid responsive member; and
2. The other face of the fluid responsive member is open to the digitizer.

As the fluid responsive member is displaced by the fluid at supply pressure, the fluid discharged by the actuator is supplied to the digitizer. The digitizer, however, will accept only a limited volume of fluid with the result that the fluid responsive member is moved only one step or increment in response to opening of the valve. When the first valve is moved to the closed position, the following events occur:

1. Fluid on both sides of the fluid responsive member is trapped and is shut off from communication with supply or return; and
2. Communication is provided between the digitizer and return so that the digitizer can discharge the fluid supplied thereto to return thereby making the digitizer ready for subsequent operation. Of course, the digitizer can be located on the supply side of the first and second valves rather than on the return side, if desired.

Another advantage of the digital control valve of this invention is that the first and second valves are controlled by simple on/off solenoids, respectively. With the solenoids energized the valve elements of the first and second valves are held in the closed position by fluid under pressure. When the solenoids are de-energized, the fluid under pressure holding the valve elements in the closed position is allowed to escape to return whereby the valve elements move to the open position.

Each of the input signals received by the digital control valve causes the digital control valve to position the fluid responsive member of the actuator one step in either direction in response to each of the electrical input signals. In actual practice, the step is a very small increment of displacement of the fluid responsive member and, therefore, a large number of steps are necessary to move the fluid responsive member a substantial distance. If the actuator must be capable of rapid movement, the stepping rate must also be very rapid.

There are factors which limit the maximum rate at which the actuator may be stepped. For example, there is a limit to the speed at which the digital control valve is capable of converting electrical pulses into accurately controlled mechanical displacement.

One important aspect of the present invention is that it overcomes the stepping rate limitation noted above. To accomplish this, the control system includes at least first and second digital control valves with each of the digital control valves having a different length step. For example, one of the digital control valves may have a step length of N and the other digital control valve may have a step length of $N+1$, i.e., a longer step. Physically, step length is easily controlled by varying the volume of hydraulic fluid which the digitizer can accept.

With the construction described above, either the $N$ step or the $N+1$ step digital control valve may be energized depending upon the position commanded for the fluid responsive member. A further advantage of this construction is that the two digital control valves may be energized substantially simultaneously so that the length of the resulting step taken by the fluid responsive member is equal to $2N+1$. Alternatively, by energizing the $N$ step digital control valve in one direction and the $N+1$ step digital control valve in the other direction, the displacement of the fluid responsive member equals the difference between the step lengths of the two valves. Thus, with two digital control valves the step lengths of the pressure responsive member may be equal to $N$, $N+1$, $2N+1$, or 1. Of course, more than two digital control valves, each of which is capable of imparting a different length step to the fluid responsive member can be used.

To provide redundancy, two or more digital valve sets each of which includes one or more digital valves may be provided. The digital valve sets may control a single actuator or each digital valve set may include a separate actuator all of which operate to position a common load. For the system in which several digital valve sets control a single actuator, the bypass mode is not used.

The present invention provides several safety features which are in addition to the safety features inherent in the digital control valve. First, the digital control valve preferably includes means such as a transducer for providing an electrical signal in response to each operation of the digitizer. This step verification signal is fed to a failure detector which also receives a signal for each pulse from the computer or other electrical command device. The computer pulses and the steps taken by the pressure responsive member should be in a predetermined ratio such as 1:1. If the failure detector notes that the ratio between step verification signals and computer pulses is outside of the acceptable tolerances, it disables the digital control valve in any suitable way such as by opening the valve elements of the digital control valve so that it no longer exerts any control influence on the position of the fluid responsive member.

Another feature of the present invention is the use of a line monitor which receives electrical pulses from the central computer or other electrical command device. If computer pulses are not received for a preselected period, this indicates an electrical failure and the line monitor appropriately disables the associated digital control valve so that it can no longer exert a controlling influence on the position of the fluid responsive member.

For control systems which employ two or more digital valves, the present invention provides synchronization control. The synchronization control causes the digital valves to operate in any desired sequence.

Although the digital control valve and the control system of this invention are adapted for use with a computer, they can also be readily used where the command signal is analogue rather than digital. In this latter event, suitable electronic apparatus is provided to convert the analogue signal into digital signals of the type to which the digital control valves are responsive.

In some instances, when a failure occurs it is desired to move the fluid responsive member to a hardover position and to lock the fluid responsive member in this position. To accomplish this, both of the valves of the digital control valve are moved to the open position in response to a failure to thereby put both faces of the fluid responsive member in communication with fluid at the same pressure, and a spring urges the fluid responsive member to a hardover position. A check valve is appropriately located to create a hydraulic lock which prevents the fluid responsive member from moving in opposition to the spring. Thus, after the spring moves the fluid responsive member to the hardover position, the member is locked in this position by the hydraulic lock.

The invention can best be understood by reference to the following description taken in connection with the accompanying illustrative drawing.

DESCRIPTION OF THE PREFERRED EMBODIMENTS

Figure 1:
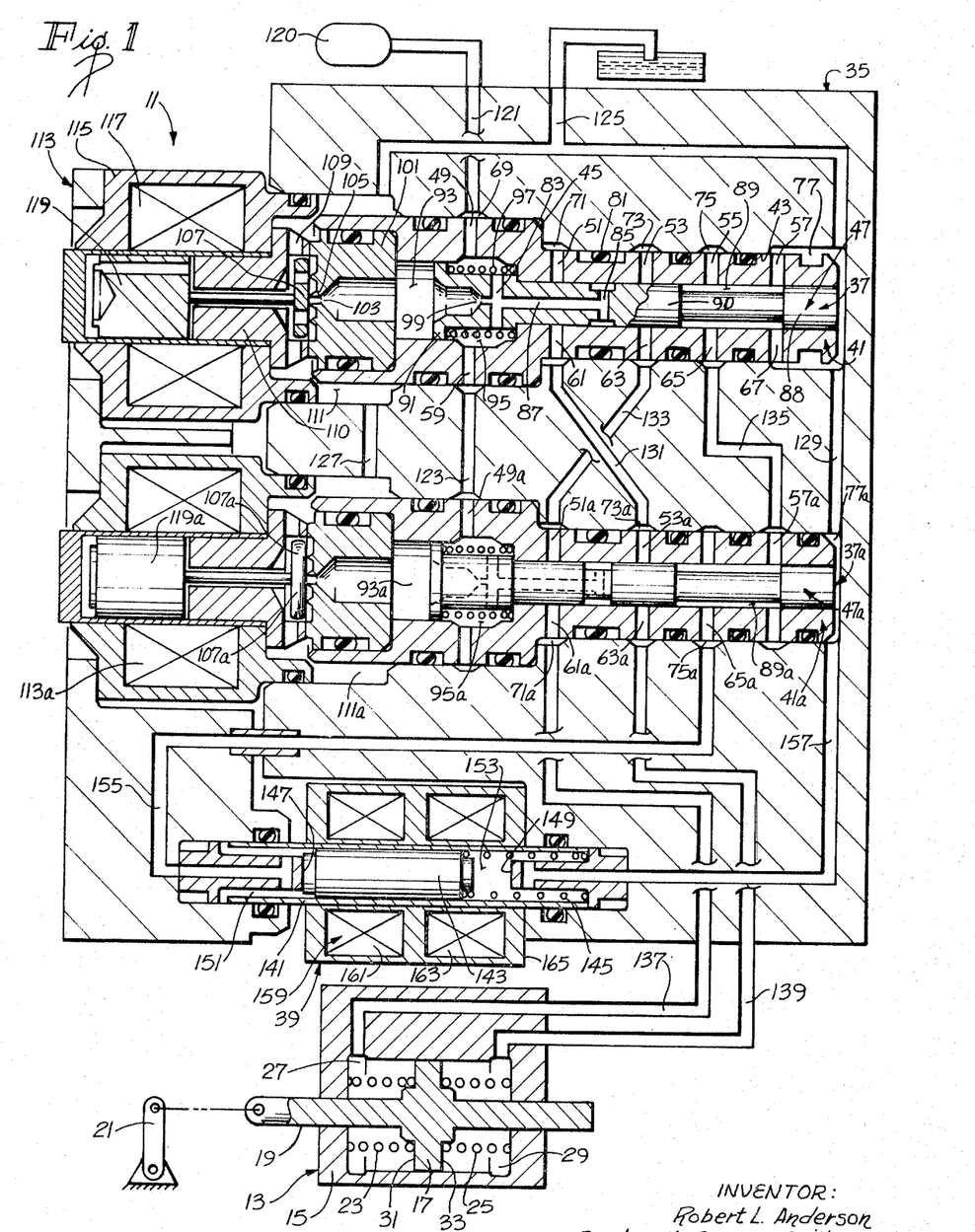
FIG. 1 is a schematic sectional view of a digital control valve and actuator constructed in accordance with the teachings of this invention with the fluid responsive member of the actuator being in the null position and with both of the valve elements being in the closed position.

FIG. 1 shows a digital control valve 11 for controlling an actuator 13. The actuator 13 in the embodiment illustrated is a linear actuator; however, other actuators such as a rotary actuator could be used if desired.

The actuator 13 includes a housing or a cylinder 15, a fluid responsive member in the form of a piston 17 mounted for sliding movement in the housing, and a connecting rod 19 for drivingly connecting the piston 17 to an output member or load 21, the position of which it is desired to control. The piston 17 is in a null position in FIG. 1 and is retained in the null position by a null centering device which, in the embodiment illustrated, includes two opposed springs 23 and 25 which are shown merely for illustration as other centering devices could be utilized. The piston 17 divides the housing 15 into chambers 27 and 29. The piston has faces 31 and 33 exposed, respectively, in the chambers 27 and 29.

Any type of driving connection between the connecting rod 19 and the output member 21 may be utilized. The output member may be a pivotable member as illustrated or it may be movable linearly or along any desired path. In actual practice of the invention, the output member 21 may perform various industrial, naval, or airborne functions. By way of example, the output member 21 may be the position command for a hydromechanical control surface actuator of an airplane.

Generally, the digital control valve 11 includes a main valve body 35, two substantially identical valves 37 and 37a and a digitizer 39. As the valves 37 and 37a are identical (except in minor respects noted hereinbelow) only the valve 37 is described in detail and corresponding parts of the valve 37a are designated by corresponding reference numerals followed by the letter a.

The main valve body 35 is constructed from one or more pieces and as illustrated contains the various conduits necessary for the hydraulic fluid. The valves 37 and 37a and the digitizer 39 are mounted in the main valve body 35.

The valve 37 includes a sleeve 41 or valve body seated in a bore 43 and a counterbore 45 of the main valve body 35. The sleeve 41 has a cylindrical passage therein in which a valve element 47 is slidably mounted. The sleeve 41 includes radial ports 49, 51, 53, 55, 57, 59, 61, 63, 65, and 67. The main valve body 35 includes annular grooves 69, 71, 73, 75 and 77 communicating with certain of the ports of the sleeve 41 as shown. The grooves in the body are sealed from each other by a plurality of seals 81.

The valve element 47 has radial ports 83 and 85 interconnected by an axial passage 87. An annular groove 89 on the valve element 47 separates a pair of lands 88 and 90 on the valve element.

The valve element 47 has a head 91 which divides a cavity in the sleeve 41 into chambers 93 and 95. A coil spring 97 acts on the head 91 to urge the valve element 47 to the left as viewed in FIG. 1. The valve element 47 has a restricted orifice 99 for providing communication between the radial port 83 and the chamber 93.

The left end of the sleeve 41 receives a plug 101 having a port 103 therein. The plug 101 defines a valve seat 105 for a valve member 107 and also forms a part of the chamber 93. A radial port 109 in a pole piece 110 provides communication between the valve member 107 and an annular groove 111 formed in the valve body 35. When the valve member 107 is open, the port 103 and 109 provide communication between the chamber 93 and the annular groove 111.

The valve member 107 is normally held in a closed position by a solenoid 113. The solenoid 113 includes a solenoid housing 115 suitably mounted on the valve body 35 and forming a part thereof, a coil 117 mounted in the solenoid housing 115 and a plunger 119 of ferromagnetic material. Normally the coil 117 is energized to maintain the plunger 119 in the position shown in FIG. 1 in which it bears against the valve member 107 and holds the latter in fluid tight sealing relationship with the valve seat 105.

Hydraulic fluid at supply pressure is supplied from a tank 120 to the chamber 95 by a conduit 121 and the port 49. Fluid under pressure is supplied from the conduit 121 to the chamber 95a via the annular groove 69, a conduit 123 and the port 49a.

The grooves 77 and 111 are connected to return via a conduit 125 and the groove 111a is maintained in communication with the groove 111 by a conduit 127. The valve 37a has a chamber 77a corresponding to the annular groove 77 and a conduit 129 provides communication between the chamber 77a and the groove 77. The chamber 77a does not surround the end portion of the associated valve body as does the groove 77.

A conduit 131 provides communication between the ports 61 and 53a and a conduit 133 provides communication between the ports 63 and 51a. A conduit 135 provides communication between the port 65 and the port 57a. It should be noted that the port 57 communicates with the groove 77 whereas the port 57a does not communicate with the chamber 77a. Conduits 137 and 139 provide communication between the port 61a and the chamber 27 of the actuator 13 and between the port 63a and the chamber 29, respectively.

The digitizer 39 includes a tube 141 rigidly mounted on the valve body 35 and a plunger 143 of ferromagnetic material mounted for sliding movement in the tube 141. A coil spring 145 urges the plunger 143 to the left as viewed in FIG. 1 and into engagement with a stop 147. The plunger can be moved to the right as viewed in FIG. 1 into a position in which it abuts a stop 149. The stops 147 and 149 precisely limit the length of stroke of the plunger 143. In moving from the stop 147 to the stop 149, the volume of the chamber 151 increases by a predetermined amount. The plunger 143 is suitably sealed to the tube 141 as by seals (not shown) or a close fit to thereby prevent fluid leakage past the plunger. The plunger 143 may be considered as dividing the tube 141 into chambers 151 and 153. A conduit 155 provides communication between the annular groove 75a and the chamber 151. A conduit 157 provides communication between the chambers 77a and 153.

The digitizer 39 also includes a step verification transducer 159. Although the transducer 159 may be of different constructions, in the embodiment illustrated it includes a pair of coils 161 and 163 mounted in a housing 165 which surrounds the tube 141. The transducer 159 also includes the plunger 143. Each of the coils 161 and 163 is in an a.c. circuit and the impedance of each of the coils increases when the plunger 143 is within such coil. Accordingly, the coil which draws the lesser current has the plunger 143 within it. Each time the plunger 143 reaches the position shown in FIG. 1, the decrease in current drawn by the coil 161 and the increase in current drawn by the coil 163 constitutes a step verification signal which is indicative of one operation or actuation of the digitizer.

The operation of the digital control valve 11 can best be understood by first considering the normal or closed positions of the valves 37 and 37a which is shown in FIG. 1. In the closed position, the solenoids 113 and 113a are energized. This forces the plungers 119 and 119a to the right as shown in FIG. 1 to hold the valve members 107 and 107a, respectively, tightly against the valve seat 105. Fluid at supply pressure is supplied to the chamber 95 via the conduit 121, the groove 69, and the radial port 49. Fluid at supply pressure flows through the restricted orifice 99 into the chamber 93. In this position, fluid at supply pressure acts over substantially the full area of the lefthand (as viewed in FIG. 1) face of the valve element 47 and over only the righthand end of the head 91. In addition, fluid at return pressure, if any, acts on the extreme righthand face of the valve element 47. Thus, the net hydraulic force acting on the valve element 47 urges the valve element to the right as viewed in FIG. 1. The only mechanical force acting on the valve element 47 is the spring 97 which urges the valve element to the left. However, the sum of the hydraulic and mechanical forces on the valve element 47 urges the valve element 47 to the right, i.e., to the closed position illustrated. This is true of both the valve element 47 and the valve element 47a.

The valves 37 and 37a perform three important functions in the closed positions thereof. First, hydraulic fluid in the chamber 27 is blocked from both supply and return and is trapped in the chamber. In this connection note that the conduit 137, the groove 71a and the conduit 133 lead only to the groove 73 which is isolated by the seals on the opposite ends thereof and by the valve element 47 from communication with either the supply conduit 121 or the return conduit 125.

Second, the hydraulic fluid in the chamber 29 of the actuator 13 is similarly isolated from the supply conduit 121 and the return conduit 125. Note that the conduit 139 which leads to the chamber 29 communicates with the annular groove 73a, the conduit 131 and the annular groove 71 which is isolated by the seals at the opposite ends thereof and by the valve element 47 from communication with the supply conduit 121 and the return conduit 125.

Finally, in the closed position shown in FIG. 1 the chamber 151 of the digitizer 39 is in communication with the return conduit 125 via the conduit 155, the annular groove 75a, the radial port 65a, the groove 89a, the radial port 57a, the conduit 135, the port 65, the groove 89, the radial port 57, and the chamber 77. The chamber 153 of the digitizer 39 is always in communication with the return conduit 125 via the conduit 157, the chamber 77a, the conduit 129, and the annular groove 77.

Figure 2:
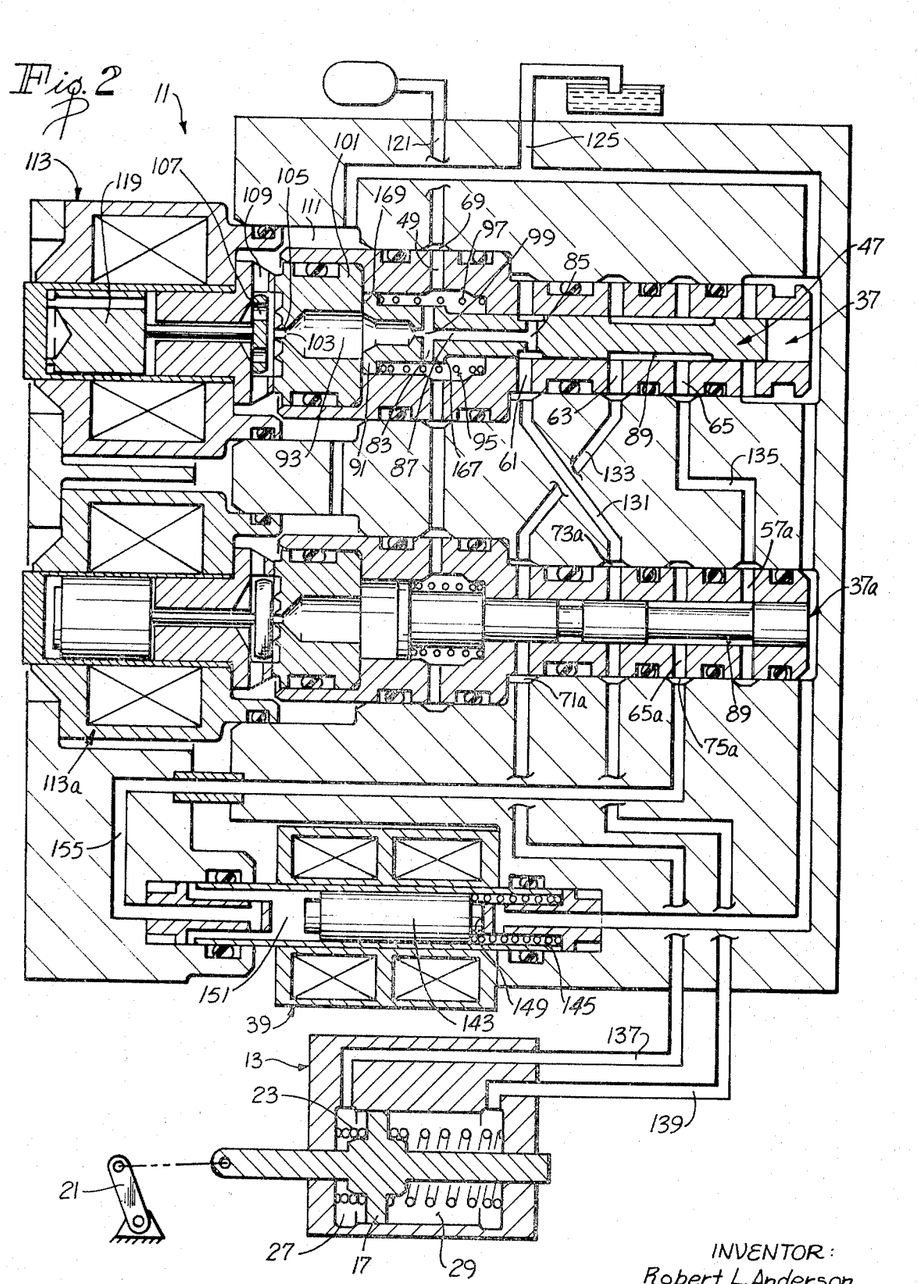
FIG. 2 is a schematic sectional view similar to FIG. 1 with one of the valve elements being open to move the fluid responsive member to the left as shown. The second of the valve elements is closed in FIG. 2.

FIG. 2 shows the digital control valve 11 with the valve 37 in the open position and with the valve 37a remaining in the closed position. To move the valve 37 to the open position, the solenoid 113 is de-energized.

De-energization of the solenoid 113 removes the force on the plunger 119 tending to move the latter to the right as viewed in FIG. 2. Consequently, the force holding the valve member 107 against the valve seat 105 is lost so that the fluid at supply pressure in the chamber 93 urges the valve member 107 to the left thereby opening the port 103. With the port 103 open, the fluid in the chamber 93 escapes through the port 103, the port 109, and the groove 111 to the return conduit 125. The return is, in accordance with conventional practice, either at no pressure or at a pressure much less than supply pressure. Because the orifice 99 has a restricted or reduced cross sectional area, fluid flowing from the chamber 95 to the chamber 93 undergoes a sufficient pressure drop so that the forces tending to urge the valve element 47 to the left are sufficient to urge the valve element to the left to the open position shown in FIG. 2. These forces include the force of the spring 97, the force of fluid of return pressure acting over the righthand end face of the valve element 47, and the force of fluid at supply pressure acting over the righthand face of the head 91.

The valve element 47 will remain in the open position so long as the port 103 remains open. However, when the solenoid 113 is again energized, the valve member 107 closes the port 103 whereupon pressure builds up in the chamber 93 until the net force acting on the valve element 47 acts to the right to return the valve element to the closed position shown in FIG. 1.

Movement of the valve element 47 to the open position shown in FIG. 2 produces two important results. First, the groove 89 is moved to provide communication between the radial ports 63 and 65. This opens the chamber 27 of the actuator 13 to the chamber 151 of the digitizer 39. This communication is provided by the conduit 137, the annular groove 71a, the conduit 133, the port 63, the groove 89, the port 65, the conduit 135, the port 57a, the groove 89a, the port 65a, the groove 75a, and the conduit 155.

Secondly, the port 85 is moved into communication with the radial port 61. This provides communication between fluid at supply pressure in the supply conduit 121 and the chamber 29. Specifically, such communication is provided by the groove 69, the port 49, the chamber 95, the port 83, the axial passage 87, the port 85, the port 61, the conduit 131, the annular groove 73a, and the conduit 139.

The overall effect of opening the valve element 47 is to supply fluid at supply pressure to the chamber 29 while opening the chamber 27 to the expandable chamber 151 in the digitizer 39. This moves the piston 17 to the left as viewed in FIG. 2 against the biasing action of the spring 23. However, the displacement of the piston 17 to the left is a function of the amount to which the chamber 151 can be expanded, i.e., the degree to which the chamber 151 can accept fluid which is expelled from the chamber 27. Thus, each time the valve 37 is open, the piston 17 moves to the left one step or increment which corresponds in length to the volume of fluid which the digitizer 39 can accept.

Specifically, fluid entering the chamber 151 moves the plunger 143 to the right until it abuts the stop 149 as shown in FIG. 2. As no leakage past the plunger 143 is permitted, the chamber 151 will not accept any more fluid from the chamber 27 whereupon movement of the piston 17 ceases.

The plunger 143 remains in this position until the valve 37 is moved to the closed position shown in FIG. 1 whereupon the chamber 151 is connected to the return conduit 125 as described hereinabove. When this occurs, the spring 145 urges the plunger 143 to the left to the position shown in FIG. 1 whereby expelling fluid from the chamber 151 into the return conduit 125. The digital control valve 11 is now prepared to receive a new command to move the piston 17 in either direction. Of course, in actual practice the above-desscribed operation of the digital control valve occurs very rapidly and many openings and closings of the valve 37 would be accomplished in a very short time interval. Although the piston 17 shown in FIG. 2 is in an extreme lefthand position, it should be understood that normally many openings and closings of the valve 37 would be necessary to move the piston 17 from the null position shown in FIG. 1 to the position shown in FIG. 2.

The length of the step taken by the piston 17 in response to each opening of the valve 37 is a function of the volume to which the chamber 151 can be expanded. Accordingly, the length of the step can be varied by varying the diameter or stroke of the plunger 143.

Each time the plunger 143 returns to the position of FIG. 1, the current drawn by the coil 161 is reduced. This constitutes a signal which is used by the failure detector as described in connection with FIGS. 5 and 6 hereof.

It should be apparent by opening of the valve 37a while holding the valve 37 in a closed position that the function described hereinabove with reference to FIG. 2 is reversed. Specifically, ly, the chamber 29 is placed in communication with the chamber 151 of the digitizer 39 and the chamber 27 is placed in communication with the supply conduit 121. In the embodiment illustrated, the step verification transducer 159 does not monitor the direction of movement of the piston 17 and it functions in the same manner regardless of the direction which the piston is being moved.

Figure 3:
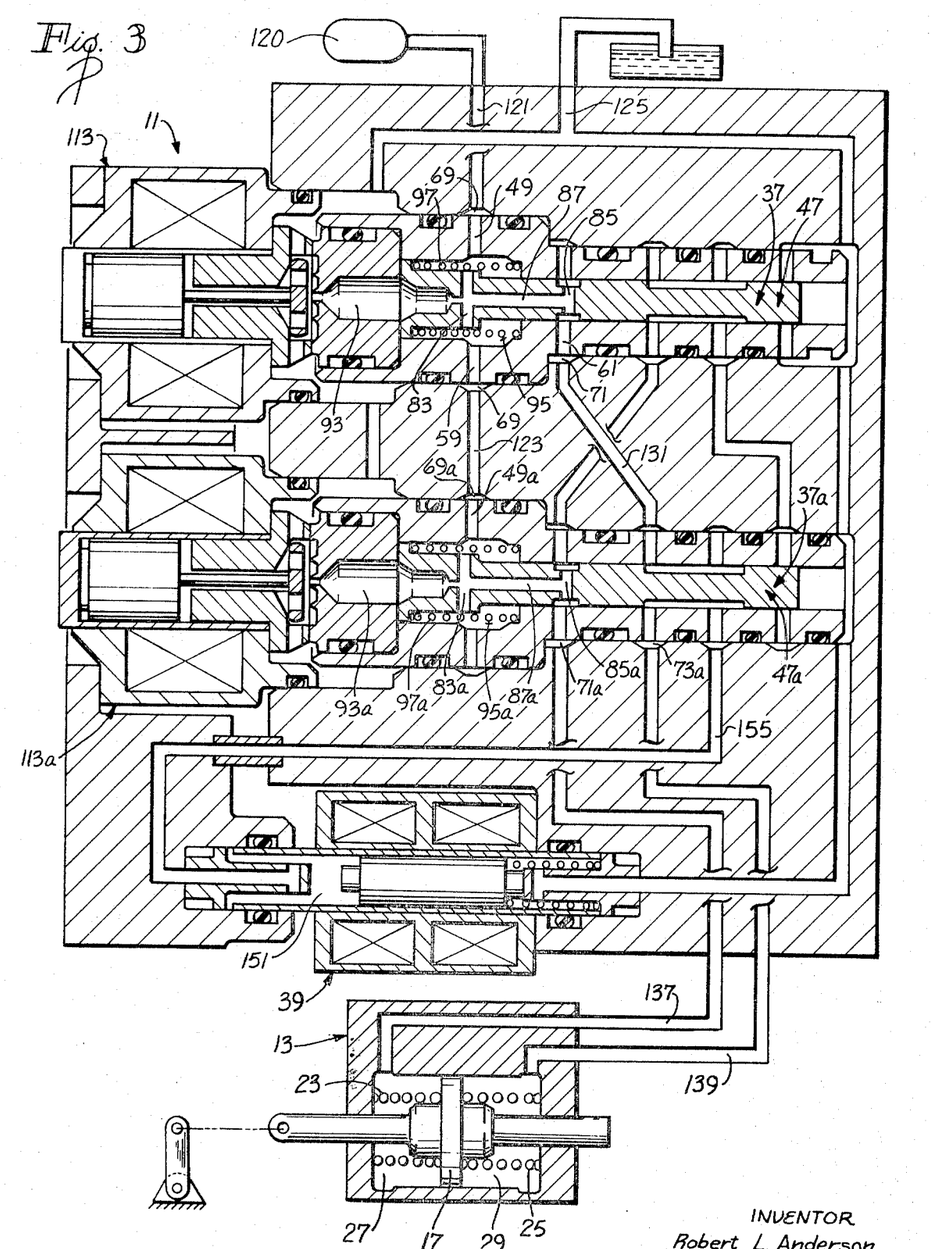
FIG. 3 is a schematic sectional view similar to FIG. 1 with both of the valve elements being open thereby indicating the bypass or fail safe mode of the digital control valve.

Both of the valves 37 and 37a can be moved substantially simultaneously to the open position as shown in FIG. 3. As explained more fully hereinbelow, with both of the valves 37 and 37a in the open position, both the chambers 27 and 29 are placed in communication with the supply conduit 121. This creates a net hydraulic force on the piston 17 of zero with the result that the centering springs 23 and 25 are operative to move the piston 17 to the null or centered position.

The advantages of the so-called bypass mode of FIG. 3 in which both of the valves 37 and 37a are opened are (1) to prevent hydraulic forces from locking the piston 17 in position in the event of an electrical failure, (2) to prevent hydraulic forces from locking the piston 17 in position in the event of the loss of fluid at supply pressure, and (3) to provide error correction. Thus, in the event of a failure another actuator can operate the output member 21 as shown, for example, in FIG. 5. To illustrate, if there is an electrical failure, both of the solenoids 113 and 113a will become de-energized. This causes movement of the valve element 47 to the open position shown in FIG. 3 as described hereinabove with reference to FIG. 2. The valve element 47a is moved to the open position in the same manner as the valve element 47. With the valves 37 and 37a both open, the chamber 27 communicates with the supply conduit 121 via the conduit 137, the annular groove 71a, the radial port 85a, the axial passage 87a, the radial ports 83a, the chamber 95a, the radial port 49a, the conduit 123 and the annular groove 69. The chamber 29 also communicates with the supply conduit 121 via the conduit 139, the annular groove 73a, the conduit 131, the annular groove 71, the ports 61 and 85, the axial passage 87, the radial ports 83, the chamber 95, the port 49, and the annular groove 69.

Secondly, if for any reason pressure of the hydraulic fluid in the supply conduit 121 should be lost, hydraulic pressure in the chambers 93 and 93a would be reduced sufficiently to allow the springs 97 and 97a to urge the valve elements 47 and 47a, respectively, to the open position shown in FIG. 3. In this event, the chambers 27 and 29 of the actuator 13 would be in communication with whatever pressure is in existence in the supply conduit 121.

A third advantage of the bypass mode shown in FIG. 3 is for error correction. During use, small errors in the position of the piston 17 relative to the position commanded by the control system, such as the control system described hereinafter, may occur. Accordingly, by causing the valves 37 and 37a to move to the bypass position shown in FIG. 3 in response to a reset command, the net hydraulic force on the piston 17 is reduced to zero and the mechanical centering device, i.e., the springs 23 and 25 move the piston to the null position. This compensates for any error that may have crept into the system, i.e., it, in effect, zeros the digital control valve 11.

Figure 4:
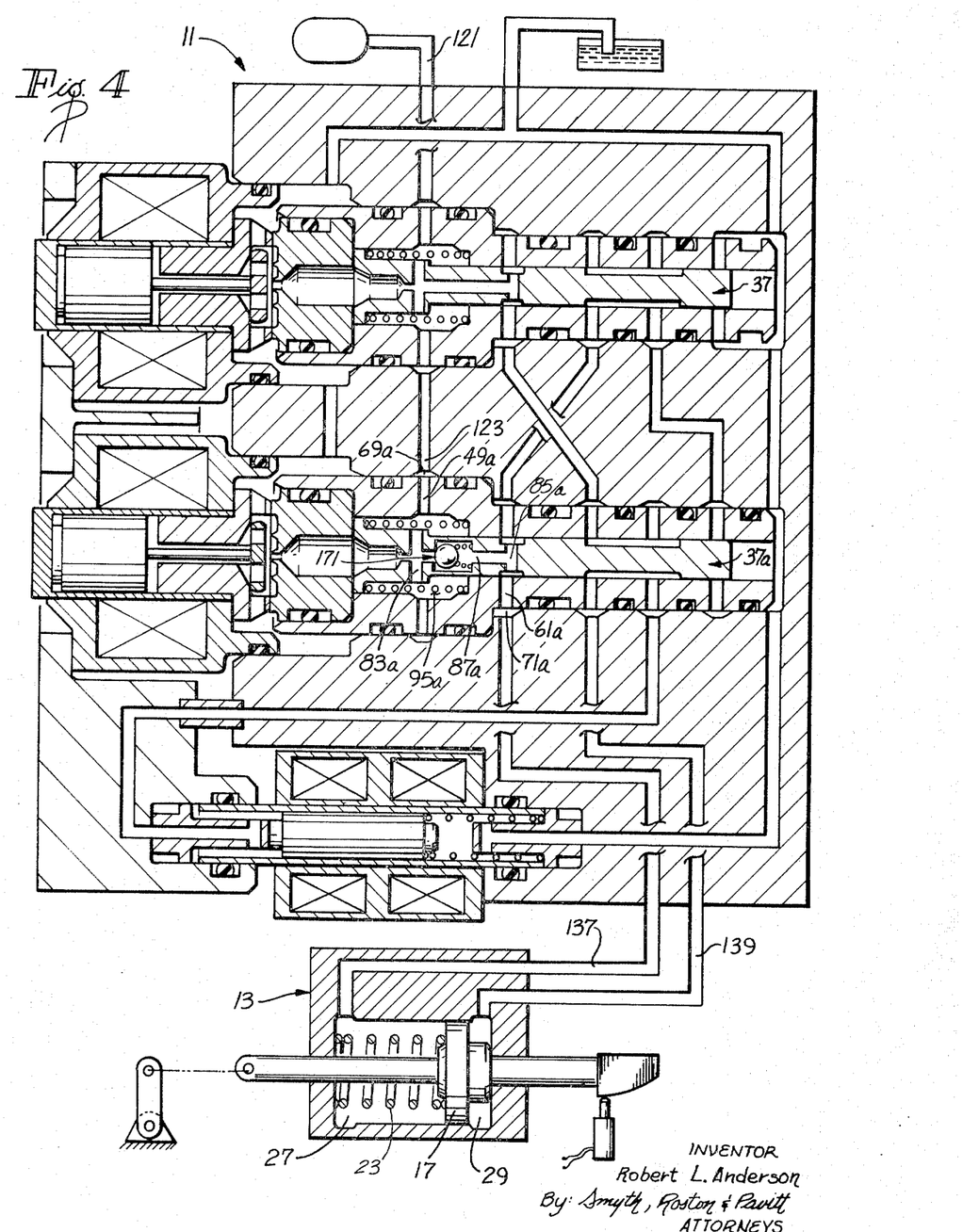
FIG. 4 is a schematic sectional view of a second embodiment of the digital control valve constructed in accordance with the teachings of this invention.

FIG. 4 shows a second embodiment of the digital control valve 11. The embodiment of FIG. 4 is identical to the embodiment of FIGS. 1–3 except for the presence of a check valve 171 in the axial passage 87a and except for the omission of the spring 25. Parts of the embodiment of FIG. 4 which correspond with parts of the embodiment of FIGS. 1–3 are designated by corresponding reference numerals.

The check valve 171 prevents fluid flow from the chamber 27 to supply or to return. The purpose of the check valve 171 is to create a hydraulic lock on the piston 17 so that in the event of an electrical failure, the piston 17 cannot be moved further to the left (as viewed in FIG. 4) than the position which it occupied at the time of failure. This result is desirable for some applications.

Specifically, in the bypass mode of FIG. 4 in which both of the valves 37 and 37a are in the open position, the chamber 29 communicates with the supply conduit 121 in the same manner as described hereinabove with reference to FIGS. 2 and 3. However, the check valve 171 prevents fluid flow from the chamber 27 to the supply conduit 121 or to return. As shown in FIG. 4, the chamber 27 is in communication with the check valve 171 via the conduit 137, the groove 71a, the ports 61a and 85a and the axial passage 87a. As no fluid can leave the chamber 27, the piston 17 cannot move further to the left than the position which it occupied at the time both of the valves 37 and 37a were open. The spring 23 pushes the piston to the hardover (extreme righthand) position shown. The error correction feature described with reference to the embodiments of FIGS. 1–3 is applicable to the embodiment of FIG. 4; however, reset occurs with the piston 17 in the extreme righthand position shown.

Figure 5:
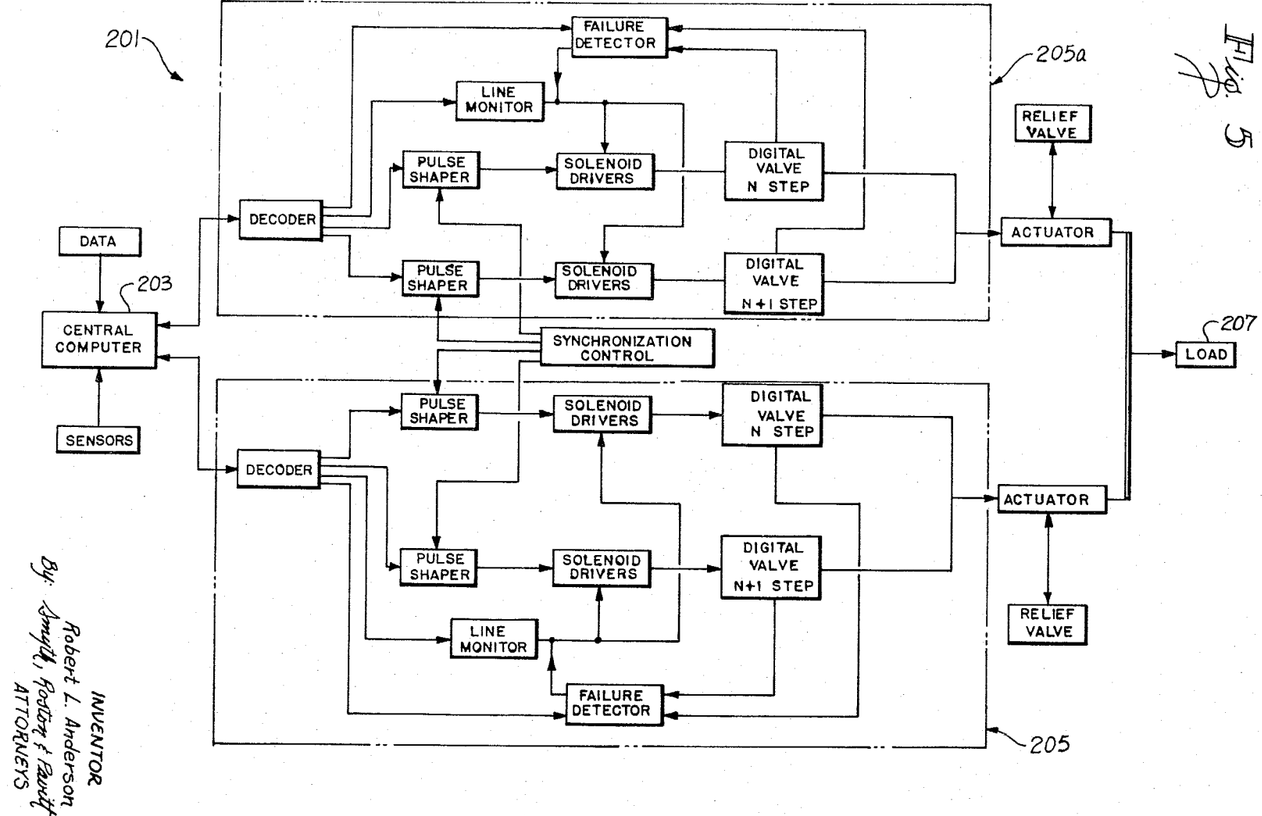
FIG. 5 is a block diagram of one form of control system constructed in accordance with the teachings of this invention. The control system of FIG. 5 uses a digital computer.

FIG. 5 shows a control system 201 constructed in accordance with the teachings of the present invention. Generally, the control system 201 includes a computer 203 and redundant identical actutor systems 205 and 205a for controlling an output member or a load 207. As the construction and operation of the system 205a is identical to the system 205, only the system 205 is described in detail herein. The control system 201 may have various industrial, naval and airborne applications.

The central computer 203 receives data and information from sensors and from this input provides a command signal which is relayed to the decoders of the systems 205 and 205a. By way of example, the data to the central computer may represent a desired aircraft attitude and the data from the sensors may represent, for example, current aircraft attitude. The load 207 may be virtually any member, the position of which it is desired to control. By way of example, the load 207 may be a device known as a modulating piston which is frequently used in aircraft hydraulic control systems. The command signal from the computer 203 is digital and may represent the number of steps which the load 207 must move in order to be at the position commanded.

The decoder transforms the digital command signal into a pulse or series of pulses which can be utilized by the actuator system 205. The decoded command signal is fed to two pulse shapers or pulse shaping networks, a line monitor and a failure detector. The decoded command signal includes a plurality of very short duration pulses supplied at relatively long intervals. By way of example, the pulse shaping network increases pulse duration to approximately 50 percent of the pulse interval. The longer duration pulses from each of the pulse shaping networks are fed, respectively, to solenoid drivers. Each of the solenoid drivers includes the necessary amplification equipment to energize a solenoid such as the solenoids 113 and 113a (FIG. 1). The outputs of the solenoid drivers constitute input signals to two digital valves, respectively. Each of the digital valves may be identical to the digital valve 11 of FIG. 1 (or FIG. 4).

The digital valves are arranged to control flow of hydraulic fluid to and from an actuator as shown in FIGS. 1 and 2. The two digital valves differ in the length of step which each will impart to the fluid responsive member of the actuator in response to each input signal thereto. The $N$ step digital valve will impart a shorter step to the fluid responsive member than will the $N+1$ step digital valve. The difference in step length may be selected to suit the requirements of each particular application. Physically the only difference in the $N+1$ and the $N$ step digital valve is in the size of the chamber 151 (FIG. 1) with this chamber being larger in the former than in the latter. By making the chamber 151 larger, it can accept a larger volume of fluid thereby providing a longer "step."

The solenoid drivers maintain the solenoids 113 and 113a (FIG. 1) of the two digital valves normally energized as described hereinabove. In response to each of the pulses from the pulse shaping network, the solenoid drivers de-energize the solenoids of the appropriate valves 37 and 37a of the associated digital valve as described hereinabove. Thus, in the embodiment illustrated the signal which causes opening of one of the valves 37 and 37a is the loss of power to the particular solenoid 113 or 113a. The pulse shaping network which increases pulse duration is necessary to allow time for the digital control valves to operate. Of course, the digital valves could be made to open in response to energizing the solenoids thereof rather than in response to de-energization of the solenoids thereof if desired.

As indicated above, the outputs of the digital valves are hydraulic and are fed to an actuator which may be either linear or rotary but in the embodiment illustrated in FIGS. 1–4 is linear. For example, the actuator may be identical to either of the actuators shown in FIGS. 1 or 4. A relief valve on the actuator is operative at a preset pressure to allow discharge of fluid pressure from the actuator.

It is apparent that the command signal from the computer 203 could cause operation of either the $N+1$ step digital valve or the $N$ step digital valve. In addition, both digital valves of the system 205 could be operated so as to tend to move the fluid responsive member of the actuator in the same direction in which event the fluid responsive member would take a step equal to $2N+1$. For fine control of the actuator, the $N+1$ and the $N$ step digital valves could be operated in opposing modes with the result that the actuator would take a step equal to $(N+1)-(N)$ or 1. This arrangement allows the actuator to be moved rapidly by taking steps equal to $2N+1$, to move at an intermediate rate by taking steps equal to $N$ or $N+1$, or to move only a small distance 1 which permits fine control of actuator movement.

The decoder provides signals to either the $N$ or the $N+1$ step digital valve depending upon which digital valve is to be actuated. If both the $N$ and the $N+1$ step digital valve are to be actuated, the decoder sends appropriate signals to both of the digital valves. The signals from the decoder also indicate the direction which the digital control valve will cause the fluid responsive member to move.

The actuator system 205 includes two safety devices operable in conjunction with the bypass valves. The first of these is a line monitor which receives decoded pulses from the decoder. The line monitor must receive a decoded pulse from the decoder within each prescribed time interval. If no such pulse is received within each such interval, an electronic failure is indicated and in response, the line monitor de-energizes both of the solenoid drivers thereby placing the digital control valves in the bypass mode (FIG. 3).

A second failure device is a failure detector. The failure detector receives pulses from the step verification transducers 159 (FIG. 1) of each of the digital valves each time the associated digital valve is operated and the decoded pulses from the decoder each of which represents one commanded actuation of one of the digital control valves. The failure detector does not monitor direction movement of the fluid responsive member nor total length moved. Rather, the failure detector simply compares the number of commands for actuation of the digital valves with the number of actual digital valve actuations.

The failure detector includes the necessary electrical apparatus to subtract the step verification signals fom the pulses from the decoder which command operation of the digital valves. So long as the number of computer pulses commanding operation of the digital valves and the number of operations of the digital valves are equal or within allowable tolerances, the failure detector remains inactive insofar as the remainder of the system 205 is concerned. However, if the signals are not equal or are not within allowable tolerances, the failure detector transmits a failure detection signal to the solenoid drivers which de-energizes the solenoid drivers and moves both of the digital valves to the bypass mode (FIG. 3).

The system 205a operates in the same manner to control an identical actuator. In the embodiment illustrated the output from the actuators is mechanical and is used to control the position of the load 207.

Each of the actuators has a spring detent such as shown in FIG. 1 to bias the fluid responsive member to a centered or other preselected position. The systems 205 and 205a under normal operating conditions are operated simultaneously. However, should one of the systems 205 or 205a fail, i.e., be placed in the bypass mode of FIG. 3, then the other is operative to control the load 207.

A synchronization control is provided between the two actuator systems 205 and 205a to cause the pulse shaping networks and hence the digital valves of the two systems to operate in the desired sequence. The synchronization control includes the necessary clocks to open the pulse shaping gates of the pulse shaping networks in the desired sequence. It is important that the digital valves of the system 205 not be operated simultaneously so as to move the fluid responsive member in different directions because this would put the associated actuator in the bypass mode. The pulses from the synchronization control operate the N step digital valve and the N+1 step digital valve in rapid succession, i.e., substantially simultaneously (assuming that operation of both of these valves is commanded) to avoid the bypass mode and to provide rapid response. The digital valves of the system 205a are operated in a similar sequence. The sequencing of the operation of the digital valves of the system 205 relative to the digital valves of the system 205a can be readily determined for any particular application. For example, both of the N step valves could be operated simultaneously and both of the N+1 step valves could be operated simultaneously.

Figure 6:
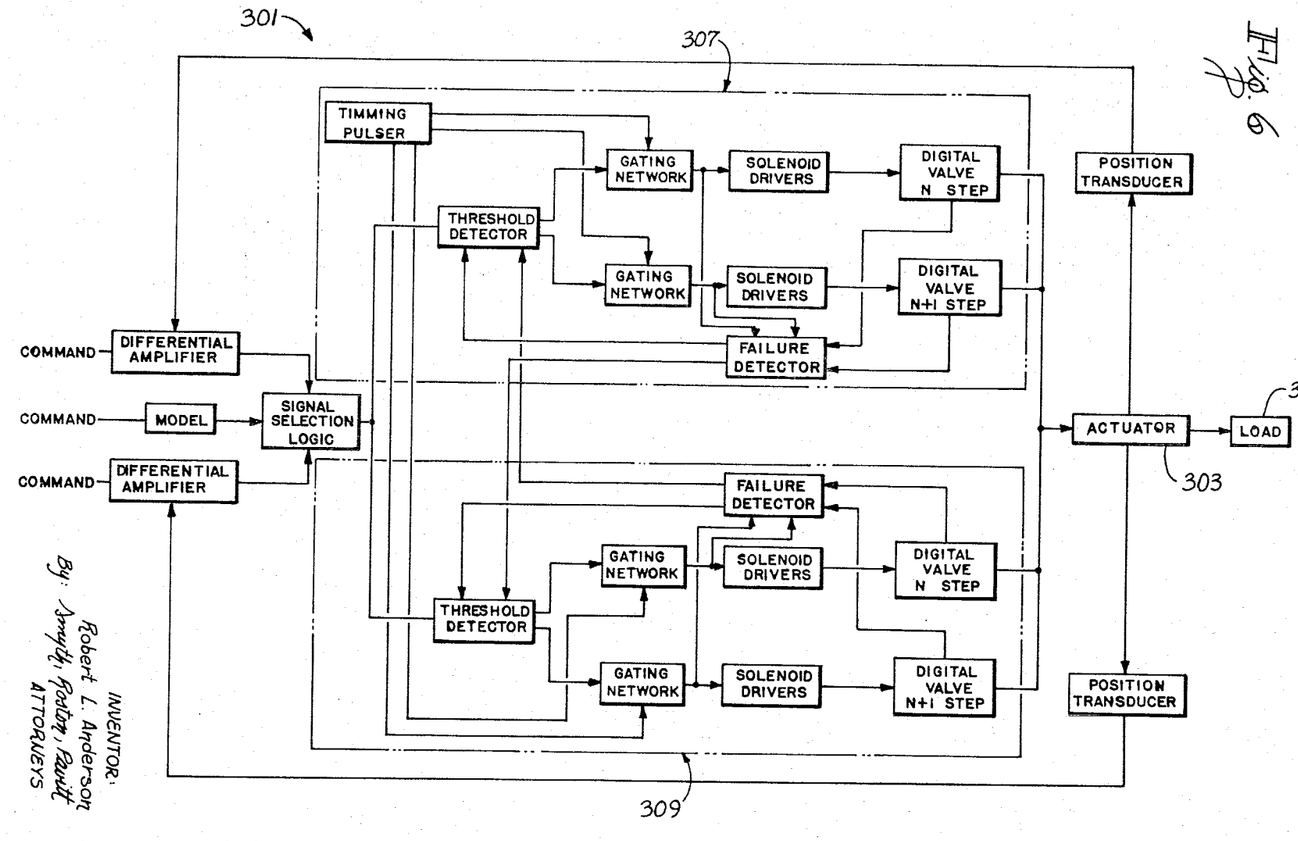
FIG. 6 is a block diagram of a second form of control system constructed in accordance with the teachings of this invention. This control system employs a single actuator and analogue command signals.

FIG. 6 shows a control system 301 which includes only a single actuator 303. The actuator 303, which may be identical to the actuator 13 (FIG. 1) drives any suitable output member or load 305 which may be, for example, a modulating piston used to control a hydromechanical control surface actuator. The actuator 303 has a fluid responsive member such as the piston 17 (FIG. 1) and the position of the fluid responsive member is controlled by valve systems 307 and 309, each of which provides one-half of the fluid necessary to move the fluid responsive element through a given stroke.

The valve systems 307 and 309 are controlled by electrical analogue signals. Electrical analogue command signals are fed to two differential amplifiers and to a model. In addition, two position transducers monitor the position of the fluid responsive member of the actuator 303 and furnish position feedback signals, each of which is proportional to the position of the fluid responsive member, to the two differential amplifiers, respectively. Each of the differential amplifiers amplifies the difference between the command signal and the associated position feedback signal and transmits the amplified signal to signal selection logic. In an ideal system the two signals from the two differential amplifiers will be identical. The model is a position transducer and differential amplifier. In an ideal system the signal transmitted from the model to the signal selection logic will be identical to the two signals from the differential amplifiers.

In actual practice, the signals from the two differential amplifiers will differ from each other. The signal selection logic selects which of the signals from the differential amplifiers will be transmitted to the valve systems 307 and 309. So long as the position transducers and differential amplifiers are operating within allowable tolerances, it is not significant which signal is selected by the signal selection logic. However, if an error should develop in one of the position transducers or in one of the differential amplifiers which is outside of the allowable tolerances, it is important that the signal which is within the allowable tolerances be selected. To determine which of the two signals from the differential amplifiers is erroneous, the signal selection logic compares the signals with the signal from the model, and the signal which deviates the least from the signal obtained from the model is utilized.

The valve systems 307 and 309 are identical so only the valve system 307 is described in detail. The selected analogue signal is transmitted from the signal selection logic to a threshold detector. The threshold detector has four thresholds, one for each possible combinations of actuations of the digital valves. If the amplitude of the signal to the threshold detector is below the level which indicates that the smallest increment or step must be taken by the fluid responsive member of the actuator 303, such signal is not transmitted by the threshold detector. However, assuming that the signal is above this predetermined level, it is fed to one or more of the two gating networks of the valve system 307. Signal amplitudes between the first and second thresholds, the second and third thresholds, the third and fourth thresholds and above the fourth threshold cause actuation of one or more of the digital valves to produce steps of 1, N, N+1 and 2N+1, respectively.

One gating network controls the solenoid drivers of an N step digital valve and the other gating network controls the solenoid drivers of an N+1 step digital valve. The threshold detector transmits the signal to the gating networks whose digital valves are to be operated in response to this signal. For example, if the signal requires a step equal to N, the signal is only fed to the gating network for the N step digital valve. However, if a large step is required then the signal is transmitted to both gating networks so that a step equal to 2N+1 can be taken by the fluid responsive member of the actuator 303.

The gating networks chop the steady state signal from the threshold detector into pulses which are transmitted to the solenoid drivers. The solenoid drivers contain the necessary amplification equipment to energize the solenoids 113 and 113a (FIG. 1) of the associated digital valves. The solenoids are normally energized and the appropriate solenoid or solenoids are de-energized by each of the pulses received by the associated solenoid driver for a time period corresponding to the duration of the pulse. The N step and the N+1 step digital valves are operable to control the actuator 303 in the same manner as described hereinabove with reference to FIG. 5.

The control system 301 has no line monitor such as the control system 201 (FIG. 5). However, each of the valve systems 307 and 309 have a failure detector each of which receives step verification pulses from the associated digital valves. A step verification signal is transmitted to the failure detector each time one of the digital valves is operated. If both of the digital valves are substantially simultaneously operated, then two step verification signals (one from each digital valve) are transmitted to the failure detector. Signals from each of the gating networks are also transmitted to the failure detector which subtracts from the signals the step verification signals. So long as the pulses from the gating networks are equal to the step verification signals or within allowable tolerances, the failure detector remains inactive insofar as the valve systems 307 and 309 are concerned. However, assuming that the failure detector of the system 309 should detect that the number of step verification signals was not within allowable tolerances relative to the pulses from the gating, it performs two important functions. First, it transmits a failure detection signal to the threshold detector of the valve system 309 which deactivates the system 309. Secondly, it transmits a failure detection signal to the threshold detector of the valve system 307 which halves each of the four thresholds so that the valve system 307 will impart twice the movement that it would have imparted to the fluid responsive member of the actuator absent failure of the system 309. This is necessary to compensate for the deactivation of the valve system 309 in that under normal operating conditions the actuator is controlled by fluid from both of the valve systems 307 and 309.

The digital valves disclosed in connection with the control system 301 may be identical to the valve 11 shown in FIG. 1 except they have no bypass mode. Thus when one of the systems 307 and 309 is deactivated by one of the failure detectors, the solenoids of the digital valves are held in an energized condition and the digital valves are held in the closed position.

It is important that the operation of the digital valves be properly sequenced so that both sides of the fluid responsive member are not simultaneously exposed to fluid at supply pressure. In the embodiment of FIG. 6 a timing pulser sends a timing pulse to all four of the gating networks to control the sequence of the operation thereof. For example, the timing pulse can be a square wave with alternate positive and negative cycles, and the gating networks for the $N$ and $N+1$ step digital valves can be responsive to the positive and negative cycles, respectively, to transmit any valve operating signal present at such gating network to the associated digital valve. With this type of control both of the $N$ step digital valves are operated simultaneously and both of the $N+1$ step digital valves are operated simultaneously with the $N$ and $N+1$ step digital valves being operated in rapid succession or substantially simultaneously.

Although exemplary embodiments of the invention have been shown and described, many changes, modifications and substitutions may be made by those having ordinary skill in the art without necessarily departing from the spirit and scope of this invention.

I claim:

1. A digital control device responsive to input signals for controlling flow of fluid to an actuator having a fluid responsive member, said control valve comprising:

a first valve having an open position in which it directs fluid under pressure to the actuator to tend to drive the fluid responsive member in one direction and a closed position in which it does not direct fluid under pressure to the fluid responsive member;

a second valve having an open position in which it directs fluid under pressure to the actuator to tend to drive the fluid responsive member in a second direction and a closed position in which it does not direct fluid under pressure to the actuator, said second direcon being different from said first direction;

first means responsive to the input signals for moving said first and second valves between said open and closed positions thereof to thereby control the position of said fluid responsive member;

digitizer means for limiting the quantity of fluid under pressure which is supplied to the fluid responsive member each time one of said valves is moved to the open position thereof whereby said fluid responsive member is displaced a first predetermined increment each time one of said valves is moved to the open position;

second means responsive to a predetermined failure for moving both of said valves to the open positions thereof; and means actuable to direct fluid to the actuator to displace the fluid responsive member a second predetermined increment, said first and second predetermined increments being different.

2. A digital control device as defined in claim 1 wherein said last mentioned means can move said fluid responsive member in either of said directions whereby said first and second valves and said last mentioned means can move said fluid responsive member the sum of or the difference between said first and second predetermined increments.

3. A digital control valve responsive to input signals for controlling flow of fluid to an actuator having a fluid responsive member, said control valve comprising:

a first valve having an open position in which it directs fluid under pressure to the actuator to tend to drive the fluid responsive member in one direction and a closed position in which it does not direct fluid under pressure to the fluid responsive member;

a second valve having an open position in which it directs fluid under pressure to the actuator to tend to drive the fluid responsive member in a second direction and a closed position in which it does not direct fluid under pressure to the actuator, said second direction being different from said first direction;

first means responsive to the input signals for moving said first and second valves between said open and closed positions thereof to thereby control the position of said fluid responsive member;

digitizer means for limiting the quantity of fluid under pressure which is supplied to the fluid responsive member each time one of said valves is moved to the open position thereof whereby said fluid responsive member is displaced a predetermined increment each time one of said valves is moved to the open position; and second means responsive to a predetermined failure for moving both of said valves to the open positions thereof.

4. A digital control valve as defined in claim 3 wherein the fluid responsive member can be moved in either of said directions without significant hydraulic interference when both of said first and second valves are in the open position.

5. A digital control valve as defined in claim 3 including valve means for blocking fluid flow out of one side of the actuator when both of said first and second valves are in said open position whereby the fluid responsive member cannot move in one direction.

6. A digital control valve as defined in claim 3 wherein said predetermined failure includes a loss of fluid under pressure.

7. A digital control valve as defined in claim 3 wherein said input signals are electrical energizing signals for holding the valves in the closed positions, said predetermined failure including a loss of said energizing signals.

8. A digital control valve as defined in claim 7 wherein said predetermined failure includes a loss of fluid under pressure.

9. A digital control valve as defined in claim 3 wherein said first means includes first and second solenoids for the first and second valves, respectively, each of said solenoids being energizable to move its associated valve to the closed position, said predetermined failure being a loss of energizing signal to both of said solenoids.

10. A digital control valve as defined in claim 3 wherein said fluid responsive member is biased toward a predetermined reset position and said first means is responsive to a reset input signal to move both of said valves to the open position.

11. A digital control valve as defined in claim 3 including means for providing an electrical signal each time said digitizer means is operated and means for comparing the number of said electrical signals with the number of said input signals.

12. A digital control valve connectible to fluid at supply pressure and to return for controlling the movement of a fluid responsive member comprising:

a valve including a valve element movable between an open position and a closed position and means for moving the valve element between said positions thereof;

a digitizer for receiving a fixed volume of fluid;

said valve having first, second and third ports connectible, respectively, to a first side of the fluid responsive member, a second side of the pressure responsive member and the digitizer;

said valve element including means responsive to said valve element being in said open position for providing communication between fluid at supply pressure and said first port and for providing communication between said second and third ports whereby the fluid at supply pressure can move the fluid responsive member in a first direction to discharge fluid from said second side of the fluid responsive member to the digitizer, said digitizer accepting only said fixed volume of fluid thereby providing a predetermined displacement of the fluid responsive member;

said valve element including means responsive to said valve element being in said closed position for providing communication between said third port and return;

said digitizer including means for discharging fluid therefrom whereby the fixed volume of fluid is expelled from the digitizer to return when the valve element is in the closed position; and said valve element including means blocking said first and second ports from supply and return, respectively, when the valve element is in said closed position.

13. A digital control valve as defined in claim 12 wherein said valve is a first valve, said digital control valve including a second valve having an open position in which it moves the fluid responsive member in a second direction which is different from said first direction.

14. A digital control valve as defined in claim 13 wherein said second valve includes a valve element movable between said open and closed positions, said last mentioned valve element blocking communication between the digitizer and return in the open position thereof.

15. A digital control valve as defined in claim 12 including means for providing an electrical signal each time said digitizer means is operated.

* * * * *